United States Patent
Fukaya et al.

(10) Patent No.: US 6,512,961 B1
(45) Date of Patent: Jan. 28, 2003

(54) METHOD AND APPARATUS FOR COLLECTING OPERATION EVENT LOGS IN NC MACHINING

(75) Inventors: Yasushi Fukaya, Aichi (JP); Sadayuki Matsumiya, Kanagawa (JP); Masayoshi Uneme, Yamatokoriyama (JP); Kazuo Yamazaki, 1500, 7th St., #7-0, Sacramento, CA (US) 95814

(73) Assignees: Okuma Corporation, Nagoya (JP); Mitutoyo Corporation, Kanagawa (JP); Mori Seiki Co., Ltd., Yamatokoriyama (JP); Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,807

(22) PCT Filed: Aug. 24, 1998

(86) PCT No.: PCT/JP98/03746
§ 371 (c)(1),
(2), (4) Date: Apr. 20, 2000

(87) PCT Pub. No.: WO00/10769
PCT Pub. Date: Mar. 2, 2000

(51) Int. Cl.[7] ............................................. G06F 19/00
(52) U.S. Cl. ............................. 700/174; 700/32; 700/28
(58) Field of Search ............................... 700/159, 182, 700/174, 108, 109, 110, 28, 32, 173, 86

(56) References Cited

U.S. PATENT DOCUMENTS

| | | | | |
|---|---|---|---|---|
| 5,291,416 A | * | 3/1994 | Hutchins | 700/174 |
| 5,323,325 A | * | 6/1994 | Izumiya | 700/174 |
| 5,469,352 A | * | 11/1995 | Yukutomo et al. | 700/87 |
| 5,544,046 A | * | 8/1996 | Niwa | 700/159 |
| 5,796,618 A | * | 8/1998 | Maeda et al. | 700/182 |
| 6,006,141 A | * | 12/1999 | Yoneda et al. | 700/169 |
| 6,400,998 B1 | * | 6/2002 | Yamazaki et al. | 700/86 |
| 6,401,004 B1 | * | 6/2002 | Yamazaki et al. | 700/159 |
| 6,438,445 B1 | * | 8/2002 | Yoshida et al. | 700/173 |

FOREIGN PATENT DOCUMENTS

| | | |
|---|---|---|
| JP | A-64-87133 | 3/1989 |
| JP | A-2-53107 | 2/1990 |
| JP | A-4-354653 | 12/1992 |
| WO | WO98/19820 | 5/1998 |

* cited by examiner

*Primary Examiner*—Leo Picard
*Assistant Examiner*—Chad Rapp
(74) *Attorney, Agent, or Firm*—Oliff & Berridge, PLC

(57) ABSTRACT

There is provided a method and device which extracts as a running operation history a modification made to an NC program for numerical control of machine tools which has already been completed. After making an NC program, modifications are made to the NC program prior to the actual operation so that experience in field work or results of test machining can be reflected. An optimum NC program can be obtained through such modifications, and contents of the modifications are extracted from the NC program as a running operation history to produce a data base. The running operation history data base is reflected in subsequent preparation of NC programs having similar conditions.

4 Claims, 21 Drawing Sheets

Fig. 5A

```
OSMPL
N1   G15  H0
N2   G0   Z500
N3   X300 Y300
N4   T1
N5   M6
N6   T3
N7   G15  H1
N8   M5
N9   S350
N10  M3
N11  G0   X-60  Y-10
N12  G56  Z10   H1
N13  M8
N14  Z3
N15  G1   Z-4.95  F15.8
N16  X-68.9  Y-18.9  F63
N17  X68.9
N18  Y-3.9
N19  X-68.9
N20  Y11.1
N21  X68.9
N22  G0   Z3
N23  Z10
N24  X-60  Y-10
N25  Z3
N26  G1   Z-1.95  F252
N27  Z-4.95  F15.8
N28  G42  X-69.89  Y-29.9  D1  F63
N29  G2   X-79.9   Y-19.89  R10.01
N30  G1   Y19.89
N31  G2   X-69.89  Y29.9   R10.01
N32  G1   X69.89
N33  G2   X79.9   Y19.89   R10.01
N34  G1   Y-19.89
N35  G2   X69.89  Y-29.9   R10.01
N36  G1   X-69.89
N37  G40  X-60  Y-10
N38  Z-9.9  F15.8
N39  X-68.9  Y-18.9  F63
N40  X68.9
N41  Y-3.9
N42  X-68.9
N43  Y11.1
N44  X68.9
N45  G0   Z3
N46  Z10
N47  X-60  Y-10
N48  Z3
N49  G1   Z-6.9  F252
N50  Z-9.9  F15.8
N51  G42  X-69.89  Y-29.9  D1  F63
N52  G2   X-79.9   Y-19.89  R10.01
N53  G1   Y19.89
N54  G2   X-69.89  Y29.9   R10.01
N55  G1   X69.89
N56  G2   X79.9   Y19.89   R10.01
N57  G1   Y-19.89
N58  G2   X69.89  Y-29.9   R10.01
N59  G1   X-69.89
N60  G40  X-60  Y-10
N61  G0   Z3
N62  Z10
N63  M5
N64  M9
N65  G15  H0
N66  G0   Z500
N67  X300 Y300
```

METHOD AND APPARATUS FOR COLLECTING OPERATION EVENT LOGS IN NC MACHINING

TECHNICAL FIELD

The present invention relates to a running operation history collecting method and device in NC machining which can extract all kinds of running operation performed during NC machining and machining conditions which are modified resulting from the running operation and can store the running operation and machining conditions as information which will be available in an expansive manner to the numerically controlled machine tool operated or other numerically controlled machine tools.

BACKGROUND ART

Operation of numerically controlled machine tools can be automatically controlled by inputting NC programs, and lately such machine tools are widely used in various industrial fields as computerized numerically controlled machine tools (CNC machine tools) in combination with micro processing technology, power electronics technology, or software technology.

Generally, numerical control information, such as an NC program, is composed of a tool exchange command, a spindle speed command, a cutting speed command, a feed rate command, a spindle movement/interpolation command, miscellaneous function command, or the like, and numerical control information suitable for such a machine tool which is an object of machining control is prepared as an NC program as occasion demands.

By adding material data and shapes of final components, the conventional numerical control information is prepared as a desired NC program using a CAD-CAM system, an automatic programming tool, or the like and then a simulation or test cutting is repeated using an actual machine tool and at the same time an adjustment (editing for correction) of the NC program is made on site, whereby the information is finally used for machining control of machine tools as an NC program for actual machining. Such a generating process for a conventional NC program will be described with reference to FIG. 1. A process design section 1 is provided with material data composed of a workpiece shape, drawing data or the like and shapes of final components, and each process is determined based on information relating to machine tools, jigs, and holders which is read out from a machine specification data base 2 and a jig/holder database 3. Here, a process means a series of machining operations to be carried out using a machine tool without changing a fixed posture of the workpiece. Further, a machining element means a group of a plurality of work elements in an identical machining position of the workpiece. In other words, a work element means single machining carried out by each tool, for example, a single operation, such as drilling or facing. Further, a machining element means that single machining is completed by combining a plurality of work elements in an identical machining position of the work. For example, in the case of tapped hole machining, a machining element is composed of three work elements, such as center hole machining, lower hole machining, and tap machining.

First, the process design section 1 determines such a process, and then in a work design section 4, a machining element to be machined at each process and a work element required for completing the machining element is recognized based on a work development database 5, and numerical control information, which is provided by an expression such as "a first process NC program 9, a second process NC program 10, ..." using each item of information relating to machining from a tool data base 6, a cutting condition data base 7, and a machining time computation data base 8, is outputted. There is a problem that the NC program made in such a manner cannot be an optimum NC program. Thus, the NC program mentioned above is sent to an NC program correction editing section 11, and then a machining operator performs modification and editing of the NC program so as to optimize a tool path and cutting conditions, such as a cutting speed, a feed rate, and a cutting depth, while carrying out a simulation, no-load running, or test cutting. The optimized NC program is inputted to a numerical control section 14 as "a post-modification first process NC program 12, a post-modification second process NC program 13 . . ." and it is used for actual machining. For such optimization, in addition to the execution of simulation or test cutting described above, it is necessary to incorporate know-how in field work. Such modification work is only put into practice as occasion demands, and it is not systematically input as machining technology or know-how acquired by machining operators and is not maintained in an easily usable form.

For example, if abnormal oscillation or noise arises while carrying out test cutting using an NC program outputted from a CAM system, a machining operator is supposed to immediately judge what the cause is and take measures based on machining technology and know-how in machining obtained by his or her own experience or study. More specifically, if there is problem with a spindle speed, the spindle speed will be regulated to an appropriate value by manipulating a spindle speed override switch on an NC console panel. If there is a problem with a feed rate, the feed rate will be regulated to an appropriate value by manipulating a feed rate override switch on the NC console panel. Also, if there is a problem with a cutting depth, while operating the NC program, a pulse handle superimposition mode will be set and the cutting depth will be regulated to an appropriate depth using a pulse handle. Further, if chips are not appropriately removed and become entangled in an edge of a tool, manual operation will be interrupted during drilling performed according to the NC program and a drill will be pulled out from a hole using a manual feed button. Also, after removing the chips entangled in the edge, a manual operation mode will be released and drilling will be commenced again. In any case, the machining operator performs modification and editing of the NC program based on the results of intervention operations at the time of test cutting. However, the various intervention operations performed by the machining operator at the time of test cutting resulted in successful adjustment, but it served as an optimum machining command on the NC program only on such particular occasions. The operator failed to leave concrete information as to how and why adjustments were made to machining s machining know-how.

Further, PCT/JP96/03264 the title of which is "NC program analyzing method and device in NC machining" discloses a method and device which analyze an NC program already modified and edited as described above and used for actual machining, extracts know-how in field work or other various machining conditions, namely, optimum information for machining or optimum cutting conditions for particular work, and uses them as a data base. However, in this device and method, a machining method analyzing section 15 fetches information regarding machining or machining conditions which are stored on the NC program already modified and edited by the machining operator as shown in FIG. 2, and a data base preparation section 16 prepares them as a data base. Therefore, it is impossible to fetch only the adjustment operation for every kind performed by the machining operator at the time of test cutting as know-how in machining.

As described above, the problem of conventional NC machining systems is that in the test cutting and the modification and editing work using the NC program which are performed by a machining operator as a routine work, it was difficult to systematically put in order and preserve in an available form the variable machining technology and know-how in machining which can be obtained only through the operator's work as described above. This means that heretofore a system administrator and a system operator did not have means to know what kind of know-how in machining the machining operator uses on site as well as means to feed back the know-how in machining acquired by the machining operator into the system. As a result, it causes a vicious circle where the machining operator repeats the daily adjustment work described above.

The present invention is made in consideration of the conventional problems described above. An object of the present invention is to make it possible to extract various running operations for adjustment and modification carried out on site in order for an NC program operation performed by a machining operator to be suitable for machining circumstances and/or to extract machining conditions modified resulting from the running operation and to use the one extracted as a data base. The running operation and the machining conditions modified which are extracted in such a manner can be fed back into a CAD-CAM system or an automatic programming system as a data base in which know-how in machining on site is accumulated. Further, by producing a data base in such a manner, the know-how in machining acquired by a particular machining operator is not limited to an individual, but available to everyone in the entire factory.

DISCLOSURE OF THE INVENTION

The present invention has running operation extracting means or a running operation extracting step which extracts running operations performed at the time of a machining operation using an NC program and/or a machining condition modified resulting from the running operation and running operation storing means or a running operation storing step which stores in a rewritable manner the running operation and/or the modified machining condition, either or both of which are extracted.

Further, the running operation extracting means include means for extracting, every time a work element is machined, the running operation and/or the machining conditions modified resulting from the running operation.

Further, the running operation extracting means include means for extracting modifying operations for a feed rate, a spindle speed, or a cutting depth.

Further, the present invention includes a medium in which a program is recorded for executing a running operation extracting procedure for extracting a running operation performed at the time of a machining operation using an NC program and/or a machining condition modified resulting from the running operation and for executing a running operation storing procedure for storing in a rewritable manner the running operation and/or the modified machining condition, either or both of which are extracted.

BRIEF DESCRIPTION OF THE DRAWINGS

FIGS. 5A, 5B, 5C, and 5D show an NC program which is used for explaining an embodiment according to the present invention, respectively.

BEST MODE FOR CARRYING OUT THE INVENTION

Detailed description of a preferable embodiment according to the present invention will subsequently be given with reference to the accompanying drawings.

Figure 1:
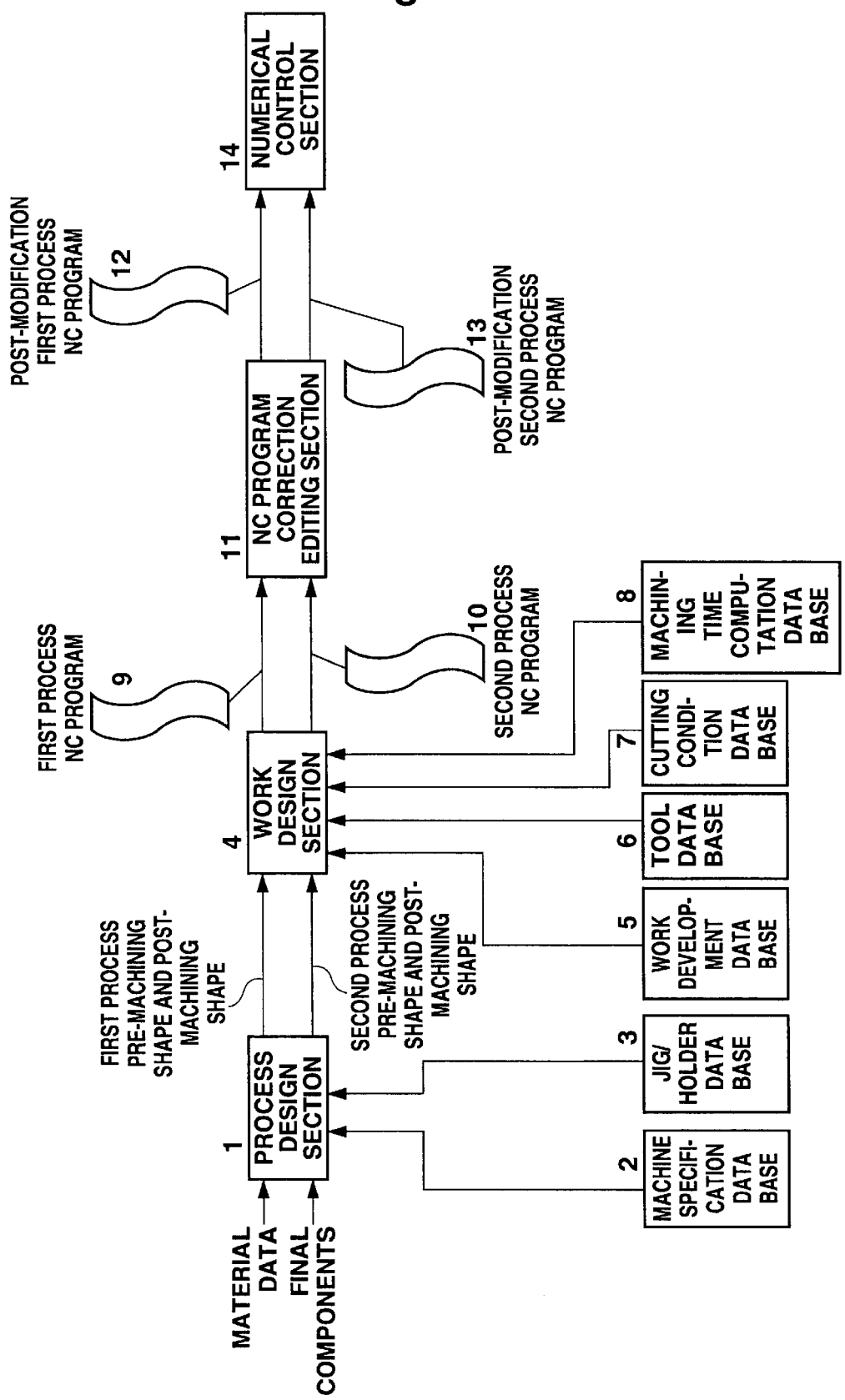
FIG. 1 is an explanatory drawing which shows conventional procedures for making an NC program.
Figure 2:
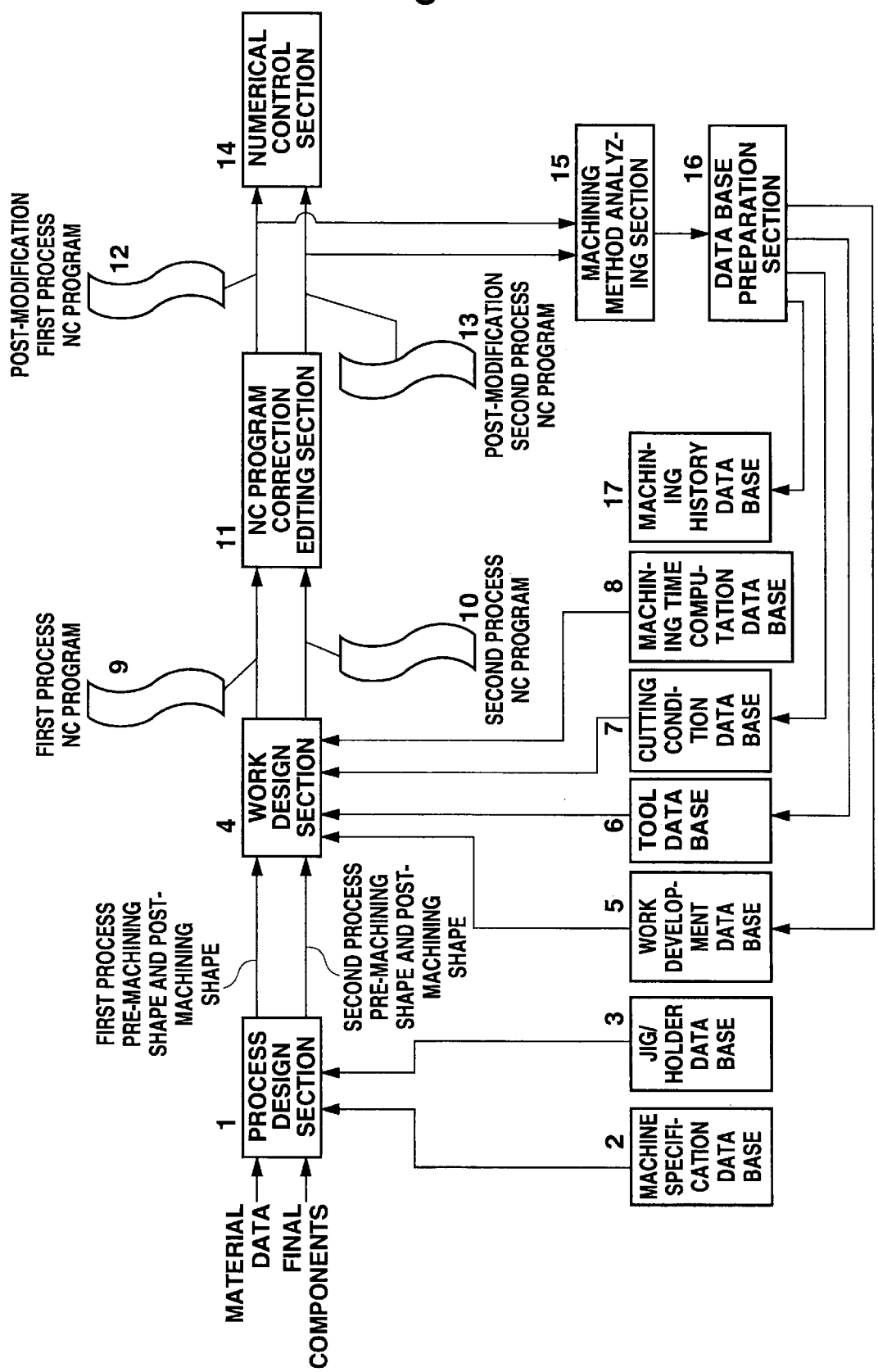
FIG. 2 is an explanatory drawing which shows that machining conditions or the like are extracted from an NC program so as to produce a data base.
Figure 3:
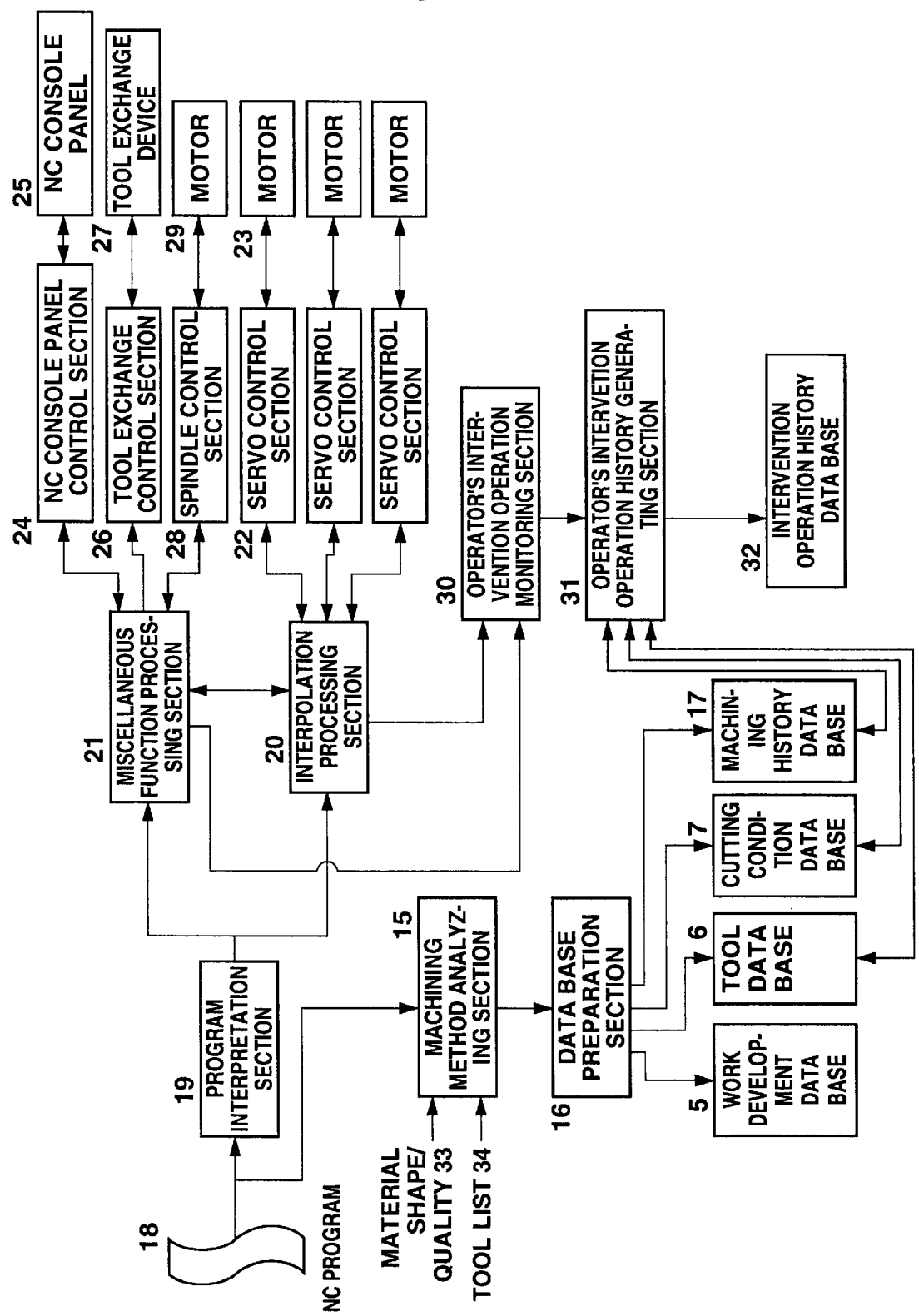
FIG. 3 is an explanatory drawing which shows an embodiment according to the present invention.

FIG. 3 is an explanatory drawing in which a running operation history collecting method and device in NC machining according to the present invention is applied.

Prior to the NC program operation, a machining method analyzing section 15 analyzes the contents of an NC program as occasion demands using information about a material shape/quality 33 and a tool list 34 according to the need, and extracts information about machining, such as know-how in machining which is included in the NC program. A data base producing section 16 writes the information about machining extracted in a work expansion database 5, a tool data base 6, a cutting condition data base 7, and a machining history data base 7 and the information is stored in these data bases.

When the NC program is operated, a program interpretation section 19 reads an NC program 18 one block at a time, converts it into an executable format, and transfers it to an interpolation processing section 20 and a miscellaneous function processing section 21. According to an interpolation command, an interpolation target location, an interpolation feed rate received from the program interpretation section 19 and a feed rate override signal received from the miscellaneous function processing section 21, the interpolation processing section 20 computes interpolation points one after another at a desired feed rate, and outputs these interpolation points to a servo control section 22 as location commands. The servo control section 22 drives a motor 23 according to the location commands. Incidentally, the interpolation processing section 20 not only carries out interpolation processing in response to such program commands, but also interpolation processing in a manual mode. For example, a signal generated by a manual feed button on an NC console panel 25 operated by the machining operator in a manual mode and a signal generated by a pulse handle operated in a pulse handle superimposition mode are sent to the interpolation processing section 20 via an NC console panel control section 24 and the miscellaneous function processing section 21. According to the manual feed button signal and the pulse handle signal received, the interpolation processing section 20 computes a desired interpolation point and outputs it to the servo control section 22 as a location command.

On the other hand, with regard to a spindle, the miscellaneous function processing section 21 receives a spindle speed command from the program interpretation section 19 and receives a spindle speed override signal on the NC console panel 25 operated by the machining operator from the NC console panel control section 24. The miscellaneous function processing section 21 then computes a spindle speed, and generates a speed signal and outputs it to a spindle control section 28. The spindle control section 28 rotates a spindle motor 29 at a desired speed according to the spindle speed signal received. Further, with regard to exchange of tools, the miscellaneous function processing section 21 receives a next tool preparation command and a tool exchange command from the program interpretation section 19. The miscellaneous function processing section 21 then generates control signals one after another according to a logical sequence for the preparation of next tool and a logical sequence for the exchange of tools, and outputs the control signals to a tool exchange control section 26. The tool exchange control section 26 drives a tool exchanging device according to the control signals received. Further, the miscellaneous function processing section 21 outputs a lamp flash signal on the NC console panel 25 to the NC console panel control section 24 in order to notify the machining operator of an operating condition of the NC program 18. The NC console panel control section 24 lights or extinguishes a lamp on the NC console panel in response to the lamp flash signal received. The NC console panel control section 24 further outputs to the miscellaneous function processing section 21 a push button signal on the NC console panel operated by the machining operator, for example, a button signal for switching to a manual mode, a button signal for setting a pulse handle superimposition mode, and a button signal for manually feeding a desired spindle. Further, similarly, the NC console panel control section 24 outputs to the miscellaneous function processing section 21 a feed rate override signal, a spindle speed override rotary switch signal, or a pulse handle signal which are generated resulting from the manipulation of the machining operator.

An operator's intervention operation monitoring section 30 monitors intervention operation performed by the machining operator during the program operation using the NC program 18, and outputs the results of monitoring to an operator's intervention operation history generating section 31. Contents to be monitored in this embodiment are the following (1), (2), (3), and (4).

(1) In which block does the operator operate a feed rate override switch on the NC console panel 25? To what percentage is a feed rate override regulated at this time?

(2) In which block does the machining operator operate a spindle speed override switch on the NC console panel 25? To what percentage is a spindle speed override regulated at this time?

(3) In which block does the machining operator set a pulse handle superimposition mode? How far does the machining operator carry out the program operation with the spindle movement superimposed using a pulse handle?

(4) In which block does the machining operator switch to a manual mode? How far does the machining operator lead a spindle movement manipulating a manual feed button before the spindle returns to an original location (the location of the spindle before the mode is switched to a manual mode) so as to switch to the program operation?

The operator's intervention operation history generating section 31 generates an intervention operation history data base 32 based on the results of monitoring described above.

So far, an embodiment according to the present invention has been described for every functional block with reference to the explanatory drawing of FIG. 3. Operation of the operator's intervention operation monitoring section 30 will now be described with reference to the flowcharts of FIGS. 6A and 6B, and operation of the operator's intervention operation history generating section 31 will be described with reference to the flowcharts of FIGS. 7A, 7B, 7C, 7D, 7E, and 7F.

Figure 6A:
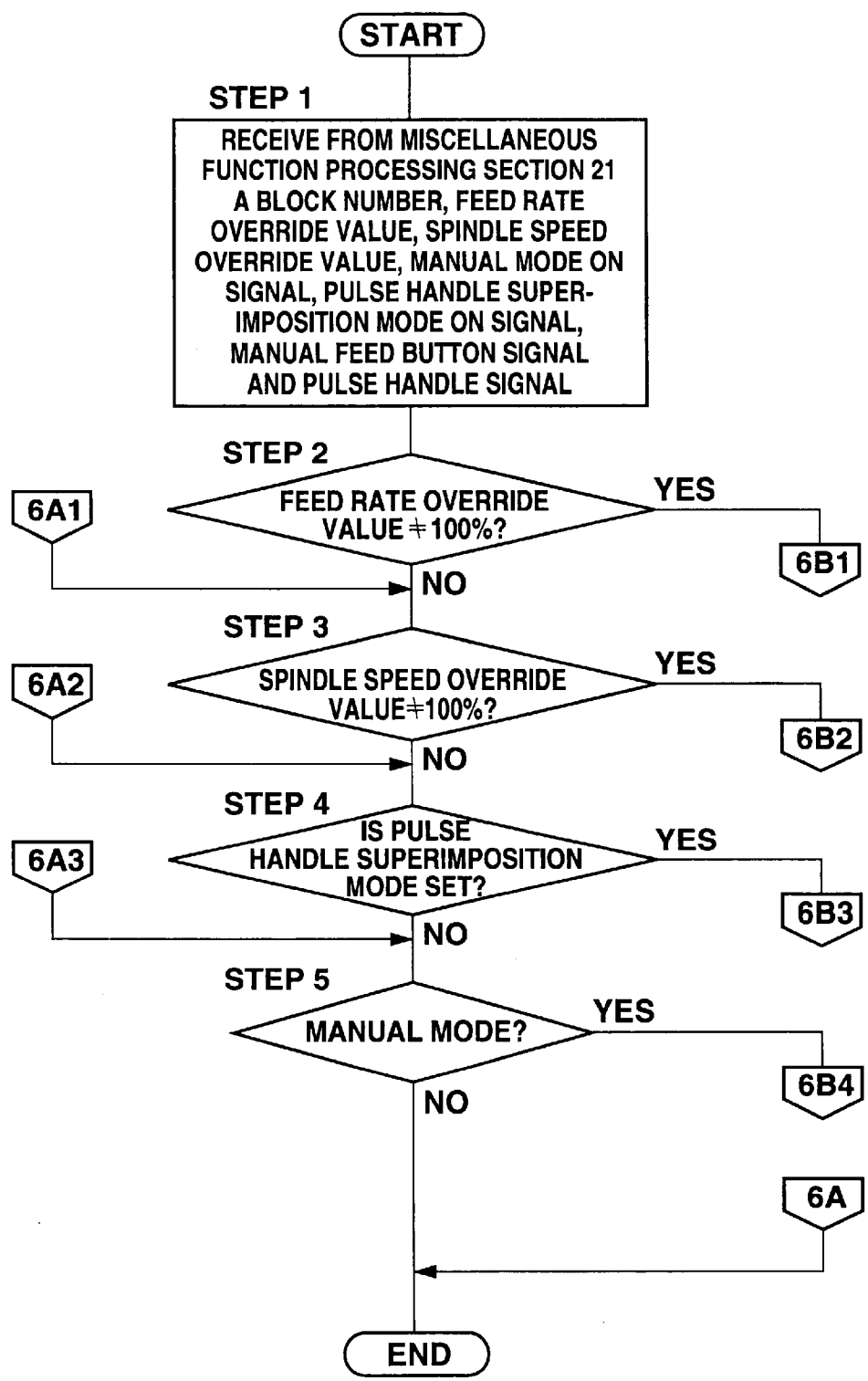
FIGS. 6A and 6B are flow charts showing operation of an operator's intervention operation monitoring section, respectively.

First, at Step 1 shown in FIG. 6A, the operator's intervention operation monitoring section 30 receives from the miscellaneous function processing section 21 a block number of the NC program 18 in operation, a value of the feed rate override on the NC console panel 25 operated by the machining operator, a spindle speed override value, a signal generated by a button for switching to a manual mode on the NC console panel 25 operated by the machining operator, a signal generated by a button for setting a pulse handle superimposition mode, a manual feed button signal, and a pulse handle signal. Next, at Step 2, it is judged if a feed rate override value is 100 percent, and if not, the program will advance to Step 6 (6B1). At Step 3, it is judged if a spindle speed override value is 100 percent, and if not, the program will advance to Step 8 (6B2). At Step 4, it is judged if a pulse handle superimposition mode is set, and if so, the program will advance to Step 10 (6B3). Further, it is judged at Step 5 if a manual mode is set, and if so, the program will advance to Step 13 (6B4).

Figure 6B:
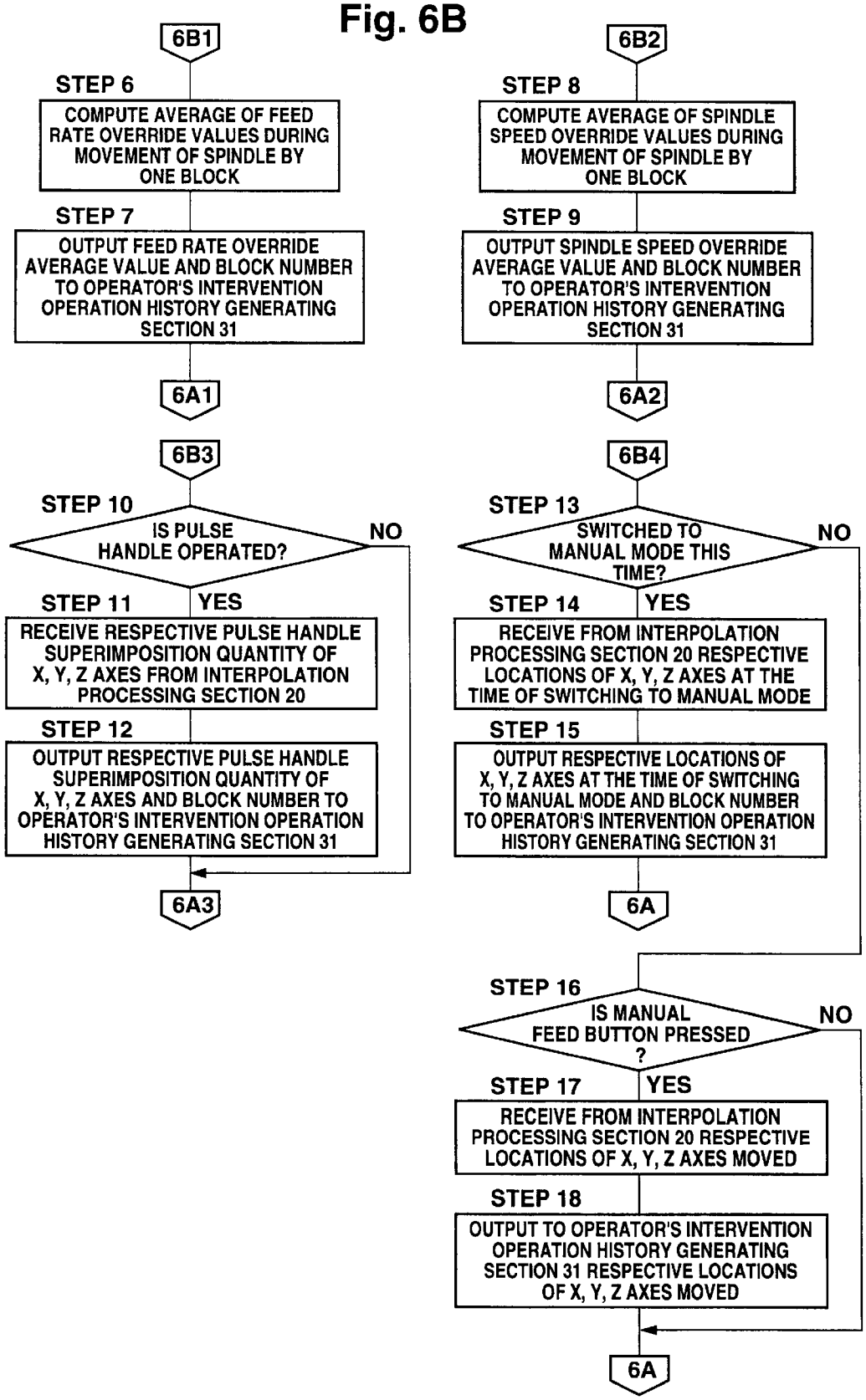

In FIG. 6B, when the feed rate override is operated, an average of feed rate override values during movement of the spindle by one block is computed at Step 6, and then at Step 7, the average value of the feed rate override and the block number are outputted to the operator's intervention operation history generating section 31 and the processing is completed. When the spindle speed override is operated, an average of the spindle speed override values during movement of the spindle by one block is computed at Step 8, and then at Step 9, the average value of the spindle speed override and the block number are outputted to the operator's intervention operation history generating section 31, and the processing is completed. When a pulse handle superimposition mode is set, it is judged at Step 10 if a pulse handle is operated in the pulse handle superimposition mode. If so, the operator's intervention operation monitoring section 30 will receive the respective quantity of pulse handle superimposition of the X, Y, and Z axes from the interpolation processing section 20 at Step 11. At Step 12, the operator's intervention operation monitoring section 30 will output the quantity of superimposition and the block numbers received to the operator's intervention operation history generating section 31 and the processing will be completed. When a manual mode is set, it is judged at Step 13 if the mode is switched to a manual mode this time. If it has already been switched to the manual mode, the operator's intervention operation monitoring section 30 will receive the respective locations of the X, Y, and Z axes at the time of switching to the manual mode from the interpolation processing section 20 at Step 14. At Step 15, the operator's intervention operation monitoring section 30 outputs the locations and the block numbers received by the operator's intervention operation history generating section 31, and the processing is completed. On the other hand, if the manual mode is continuously maintained, it will be judged at Step 16 whether or not the manual feed button is pressed. If it is pressed, the operator's intervention operation monitoring section 30 will receive the respective locations of the X, Y, and Z axes moved in the manual mode from the interpolation processing section 20 at Step 17. At Step 18, the operator's intervention operation monitoring section 30 will output the locations to the operator's intervention operation history generating section 31 and the processing will be completed.

Figure 4:
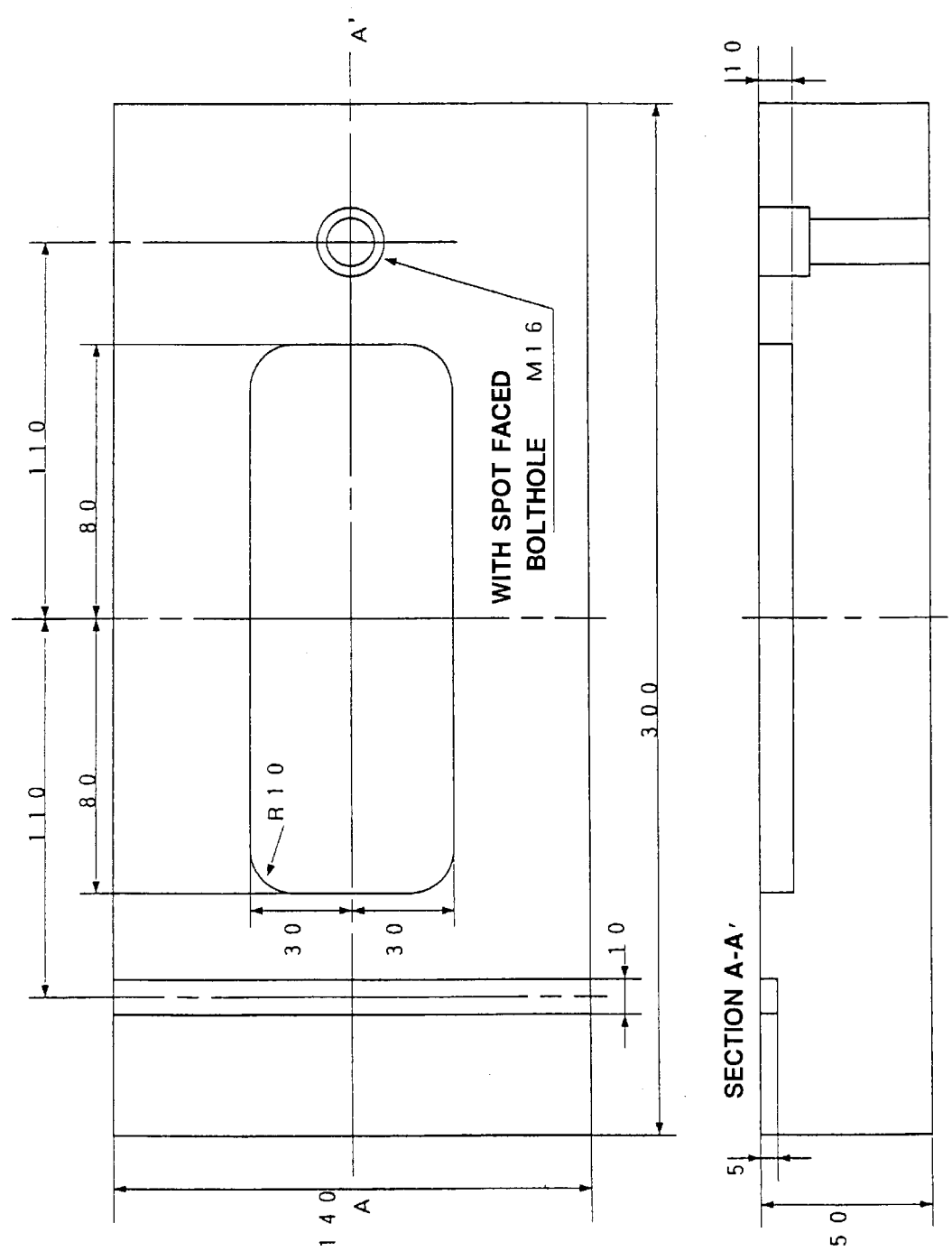
FIG. 4 is a drawing for machining which is used for explaining an embodiment according to the present invention.
Figure 5B:
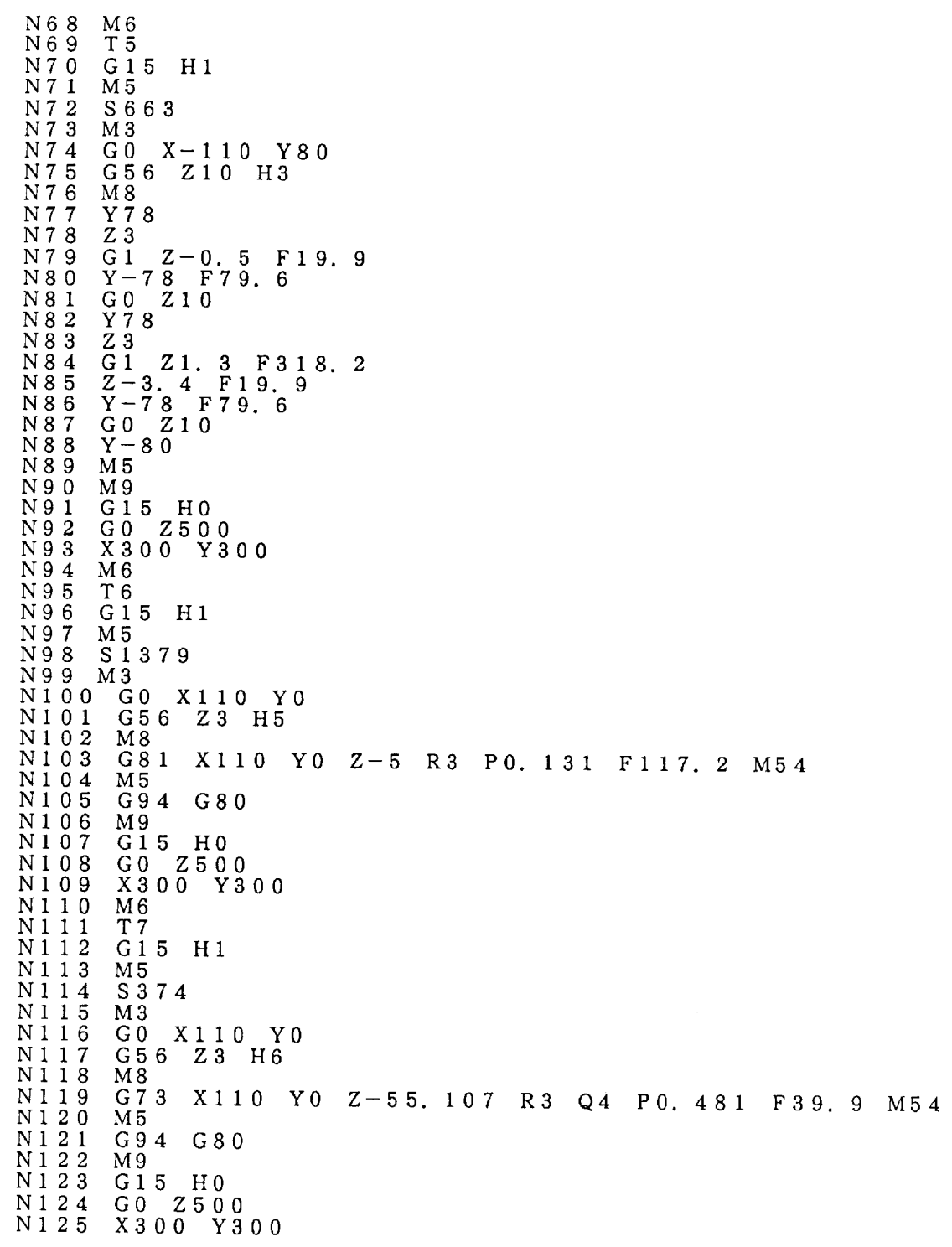
Figure 5C:
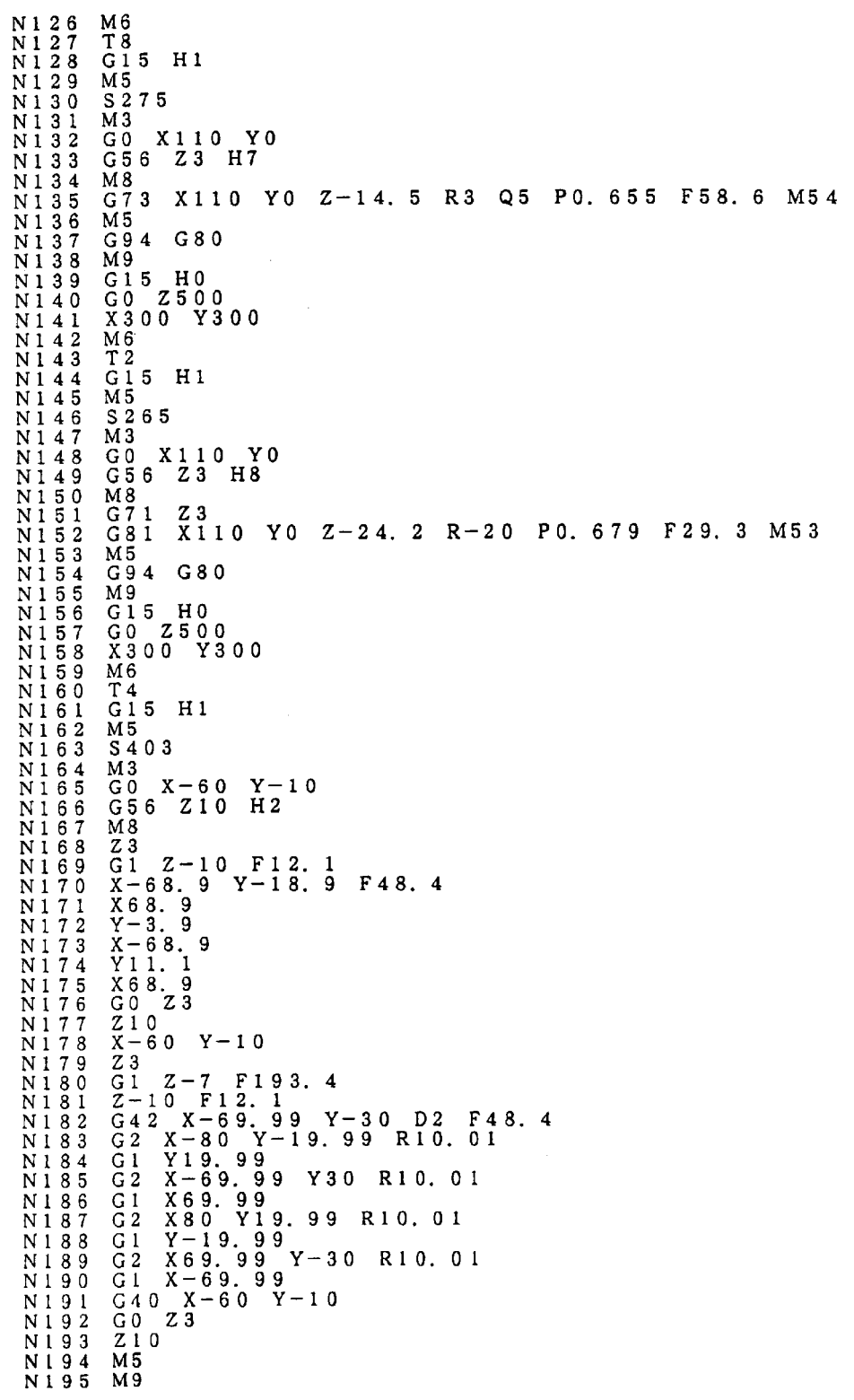
Figure 5D:
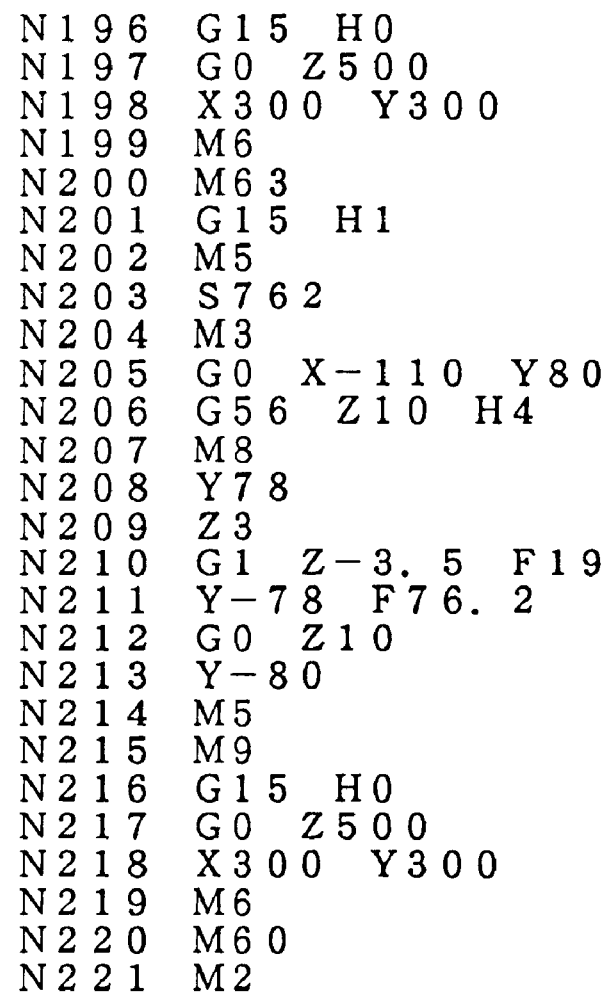
Figure 8:
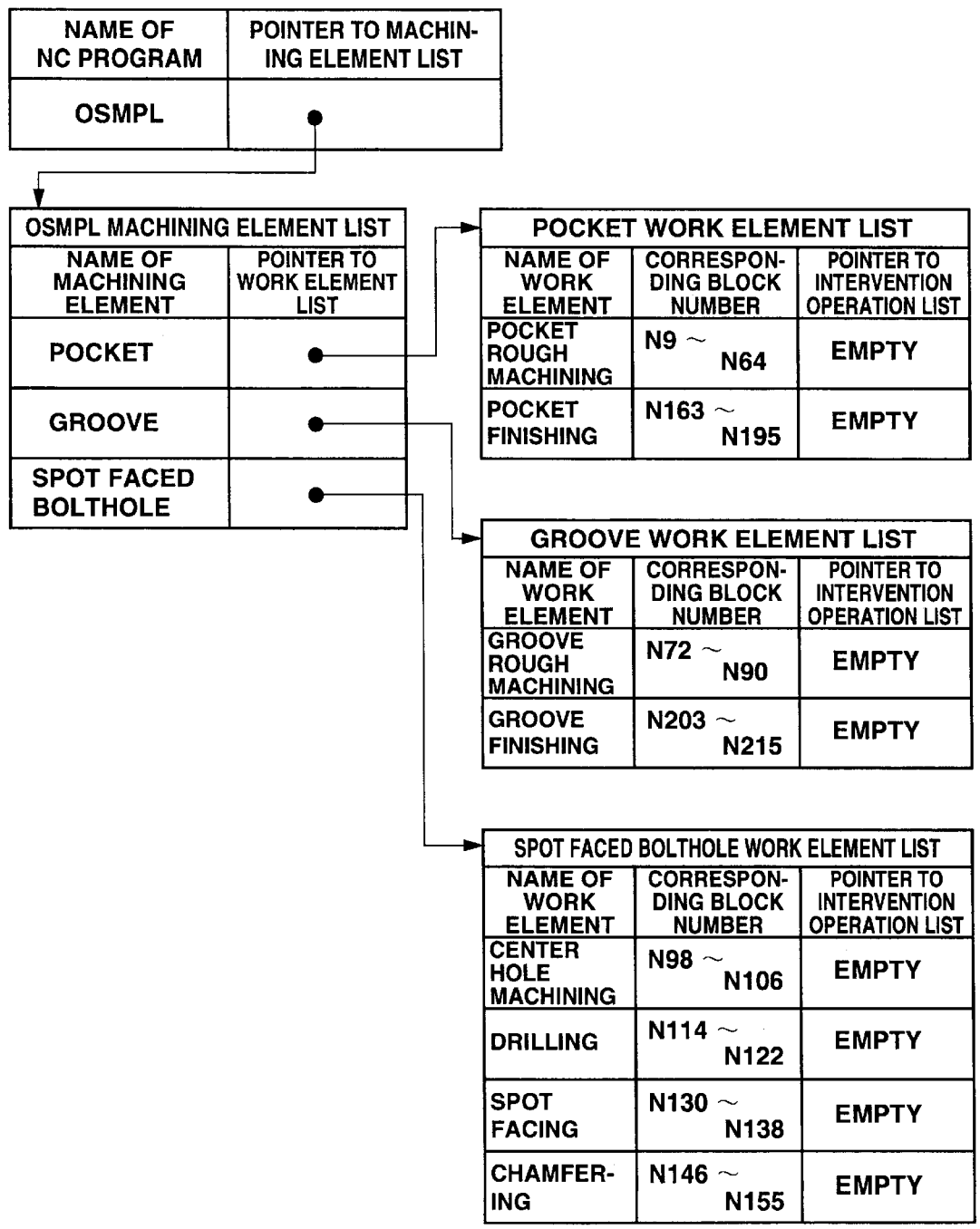
FIG. 8 shows an example of initial structure of an intervention operation history data base generated by the operator's intervention operation history generating section.

As described above, the operator's intervention operation history generating section 31 produces a data base using the data monitored. Prior to production of the data base, the operator's intervention operation history generating section 31 generates the initial structure of an intervention operation history data base in advance. The initial structure is shown in FIG. 8. FIG. 8 shows fundamental parts of the drawing for machining shown in FIG. 4 and the respective operator's intervention operation history data bases corresponding to the NC program which are shown in FIGS. 5A, 5B, 5C, and 5D. This drawing shows in its "OSMPL" machining element list that an NC program "OSMPL" is composed of three machining elements, such as a pocket, a groove, and a spot faced bolthole. Next, a work element list which constitutes pocket machining elements is composed of pocket rough machining and pocket finishing, and block numbers on the NC program which execute respective work elements are N9 to N64 and N163 to N195. Further, the work element list has information which links with an intervention operation list generated in serial order by the operator's intervention operation history generating section 31 based on data monitored by the operator's intervention operation monitoring section 30. At this time, the intervention operation list has not yet been generated, and therefore the link information is empty. A work element list for the groove and a work element list for the spot faced bolthole have a similar structure.

Figure 7A:
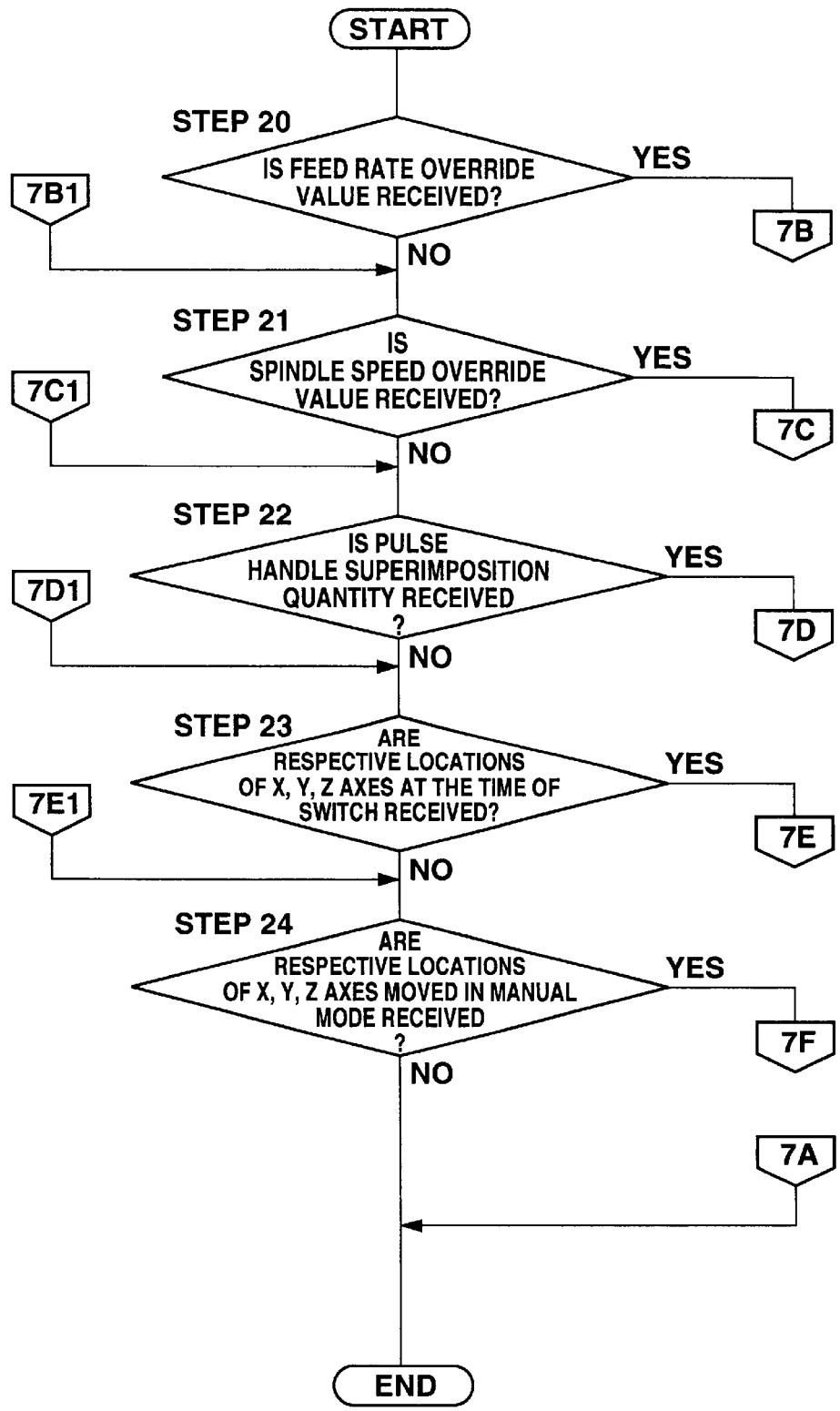
FIGS. 7A, 7B, 7C, 7D, 7E, and 7F are flowcharts showing operation of an operator's intervention operation history generating section, respectively.

In such a condition, the operator's intervention operation history generating section 31 judges, at Step 20 shown in FIG. 7A, if a feed rate override value is received, and if so, the program will advance to Step 25(7B). At Step 21, it is judged if a spindle speed override value is received, and if so, the program will advance to Step 33 (7C). At Step 22, it is judged if a quantity of pulse handle superimposition is received, and if so, the program will advance to Step 41 (7D). At Step 23, it is judged if respective locations of the X, Y, and Z axes at the time of switching to a manual mode are received, and if so, the program will advance to Step 49 (7E). Further, at Step 24, it is judged if respective locations of the X, Y, and Z axes moved in a manual mode are received, and if so, the program will advance to Step 57 (7F).

Figure 7B:
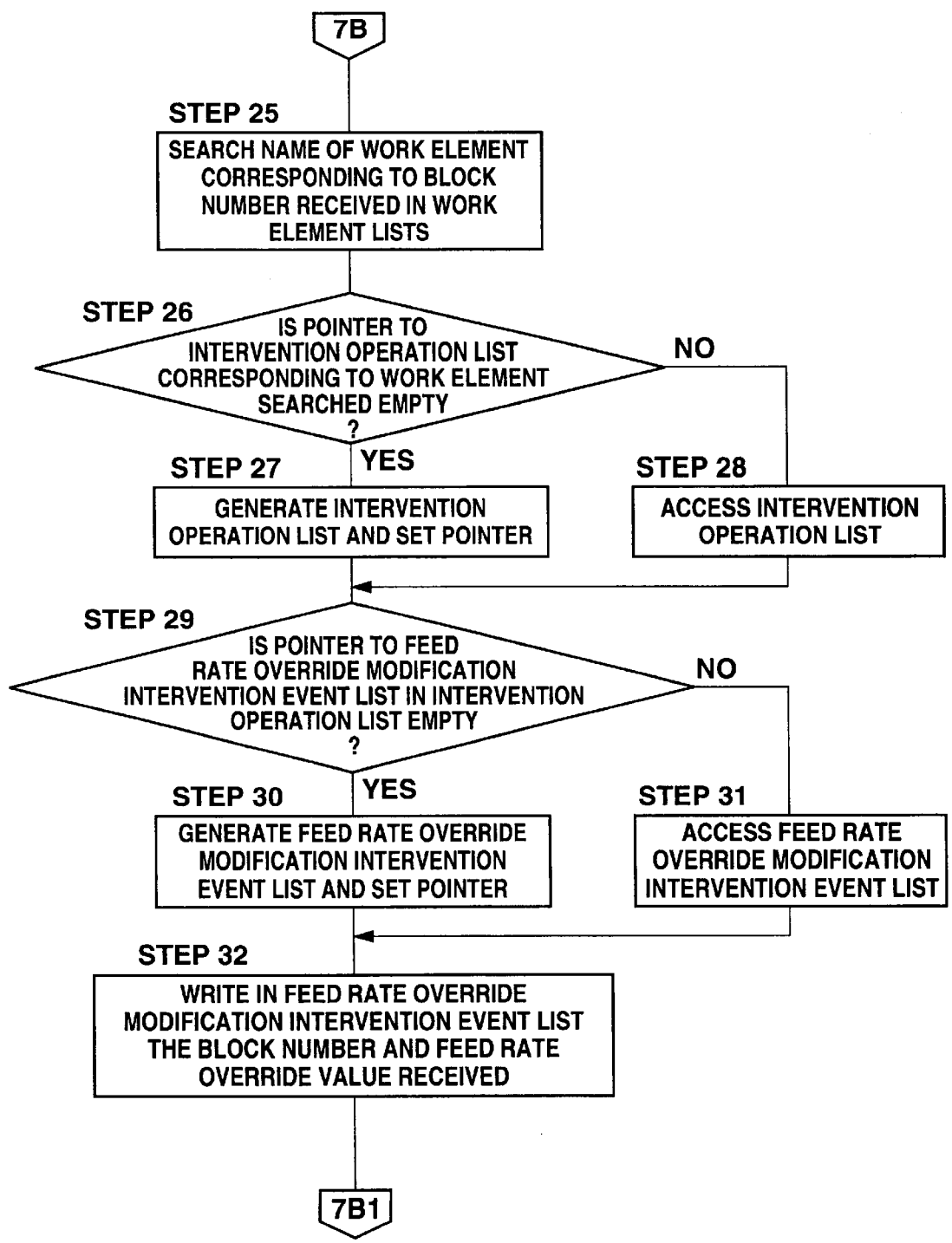

In FIG. 7B, when a feed rate override value is received, at Step 25 the operator's intervention operation history generating section 31 searches a name of the work element in the work element lists of FIG. 8 which corresponds to the block number received. At Step 26, it is judged if information which links with an intervention operation list corresponding to the work element searched is empty, and if it is empty, at Step 27 a corresponding intervention operation list (described hereinafter) will newly be generated and information which links with the intervention operation list will be set. If the information which links with an intervention operation list is not empty, according to the link information, the subsequent intervention operation list will be accessed at Step 28. At Step 29, it is judged if information which links with a feed rate override modification intervention event list (described hereinafter) in the intervention operation list is empty. If the link information is empty, at Step 30 a feed rate override modification intervention event list will be newly generated and the information which links with the intervention event list will be set. If the information which links with a feed rate override modification intervention event list is not empty, at Step 31 according to the link information, the subsequent intervention event list will be accessed. At Step 32, block numbers and feed rate override values are written in the feed rate override modification intervention event list.

Figure 7C:
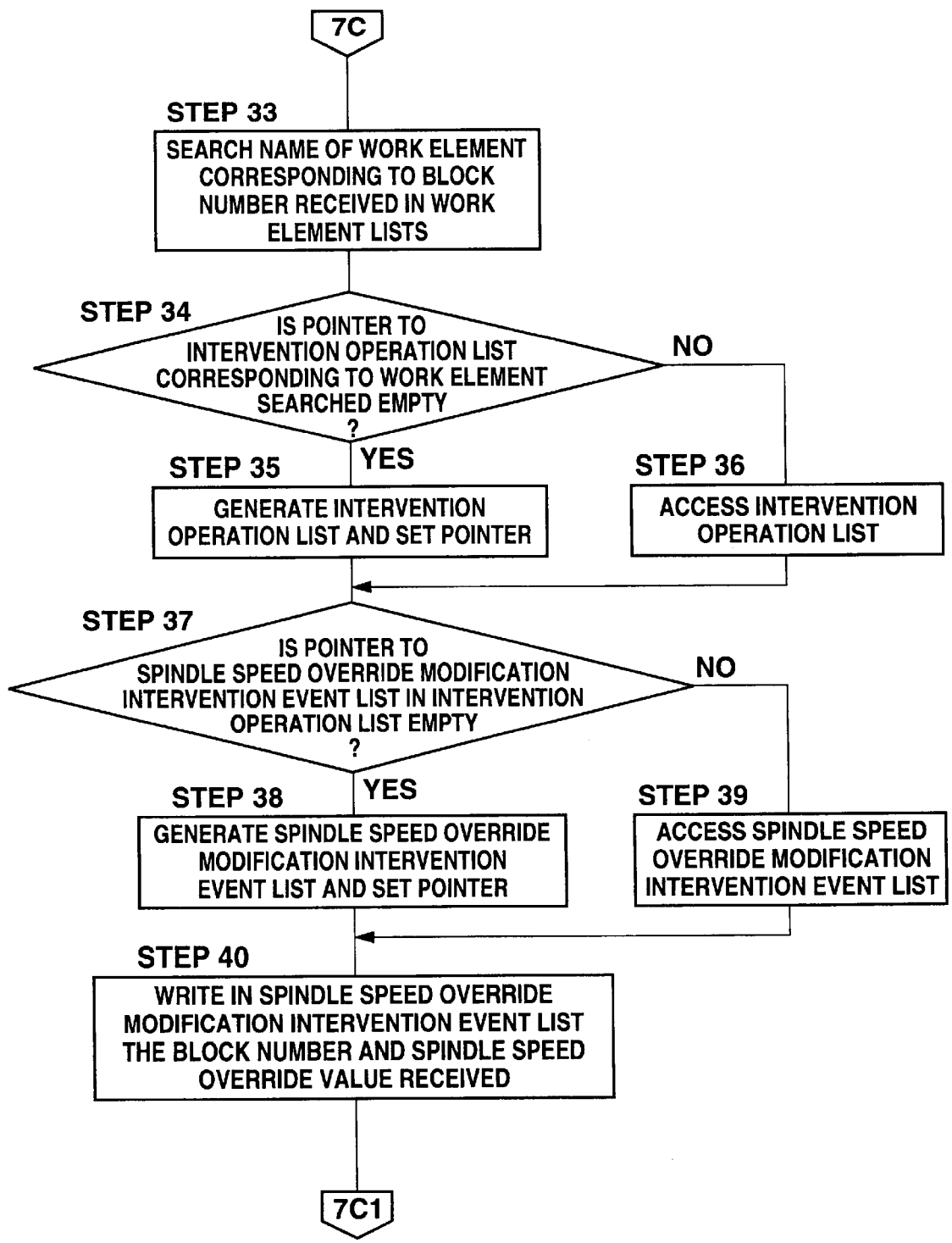

In FIG. 7C, when a feed rate override value is received, at Step 33 the operator's intervention operation history generating section 31 searches a name of the work element in the work element lists of FIG. 8 which corresponds to the block number received. At Step 34, it is judged if information which links with the intervention operation list corresponding to the work element searched is empty. If the link information is empty, at Step 35 an intervention operation list (described hereinafter) will be newly generated, and the information which links with the intervention operation list will be set. If the information which links with an intervention operation list is not empty, according to the link information, the subsequent intervention operation list will be accessed at Step 36. At Step 37, it is judged if information which links with a spindle speed override modification intervention event list (described hereinafter) in the intervention operation list is empty. If the link information is empty, a spindle speed override modification intervention event list will be newly generated and the information which links with the intervention event list will be set at Step 38. If the information which links with a spindle speed override modification intervention event list is not empty, according to the link information, the subsequent intervention event list will be accessed at Step 39. At Step 40, block numbers and spindle speed override values are written in the spindle speed override modification intervention event list.

Figure 7D:
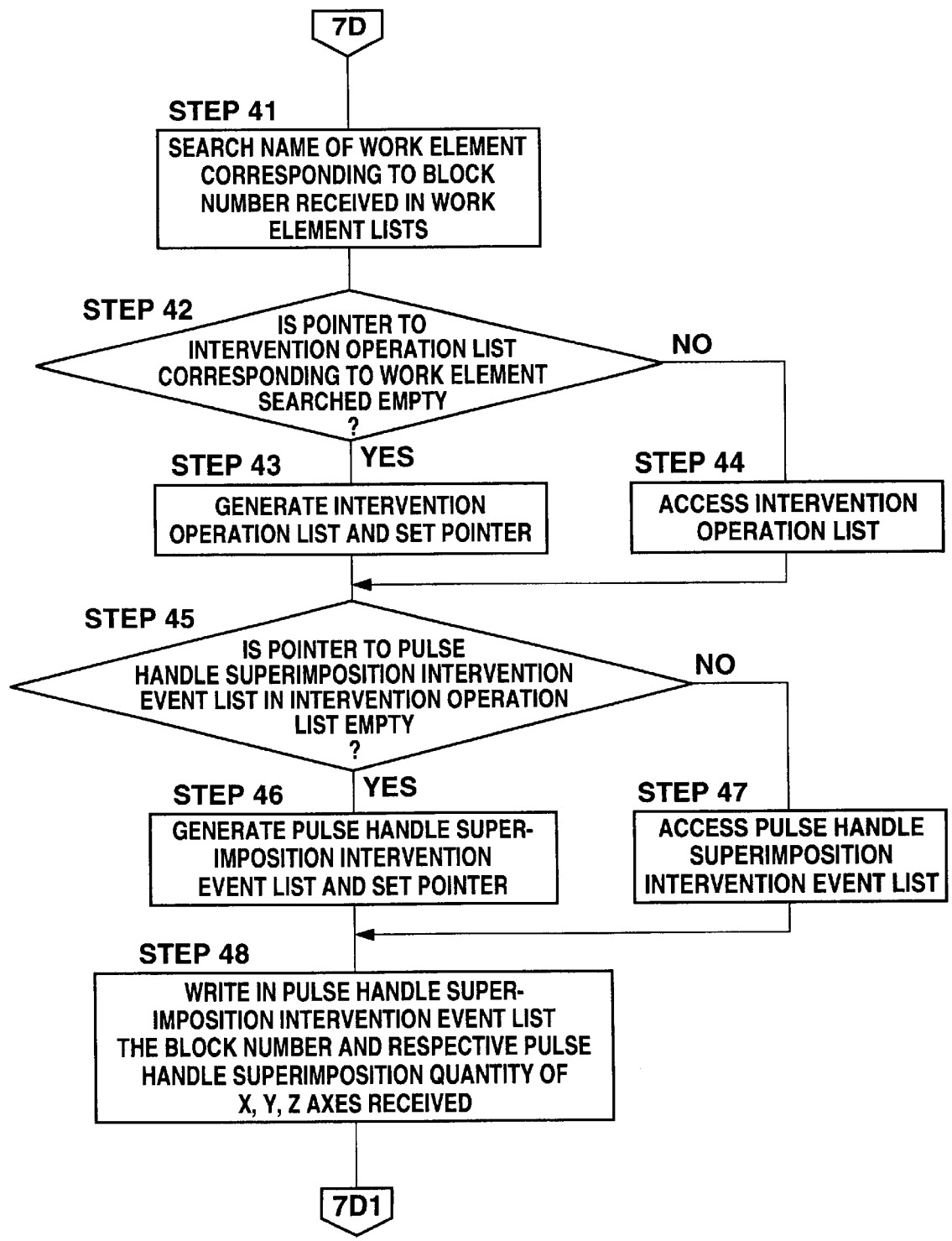

In FIG. 7D, quantity of pulse handle superimposition is received, and at Step 41 the operator's intervention operation history generating section 31 searches a name of the work element in the work element lists of FIG. 8 which corresponds to the block number received. At Step 42, it is judged if information which links with the intervention operation list corresponding to the work element searched is empty. If the link information is empty, at Step 43 an intervention operation list (described above) will be newly generated, and the information which links with the intervention operation list will be set. If the information which links with an intervention operation list is not empty, according to the link information, the subsequent intervention operation list will be accessed. At Step 45, it is judged if information which links with a pulse handle superimposition intervention event list (described hereinafter) in the intervention operation list is empty. If the link information is empty, at Step 46 a pulse handle superimposition intervention event list will be newly generated, and the information which links with the intervention event list will be set. If the information which links with a pulse handle superimposition intervention event list is not empty, according to the link information, the subsequent intervention event list will be accessed. At Step 48, a block number and respective pulse handle superimposition quantity of the X, Y, and Z axes are written in the pulse handle superimposition intervention event list.

Figure 7E:
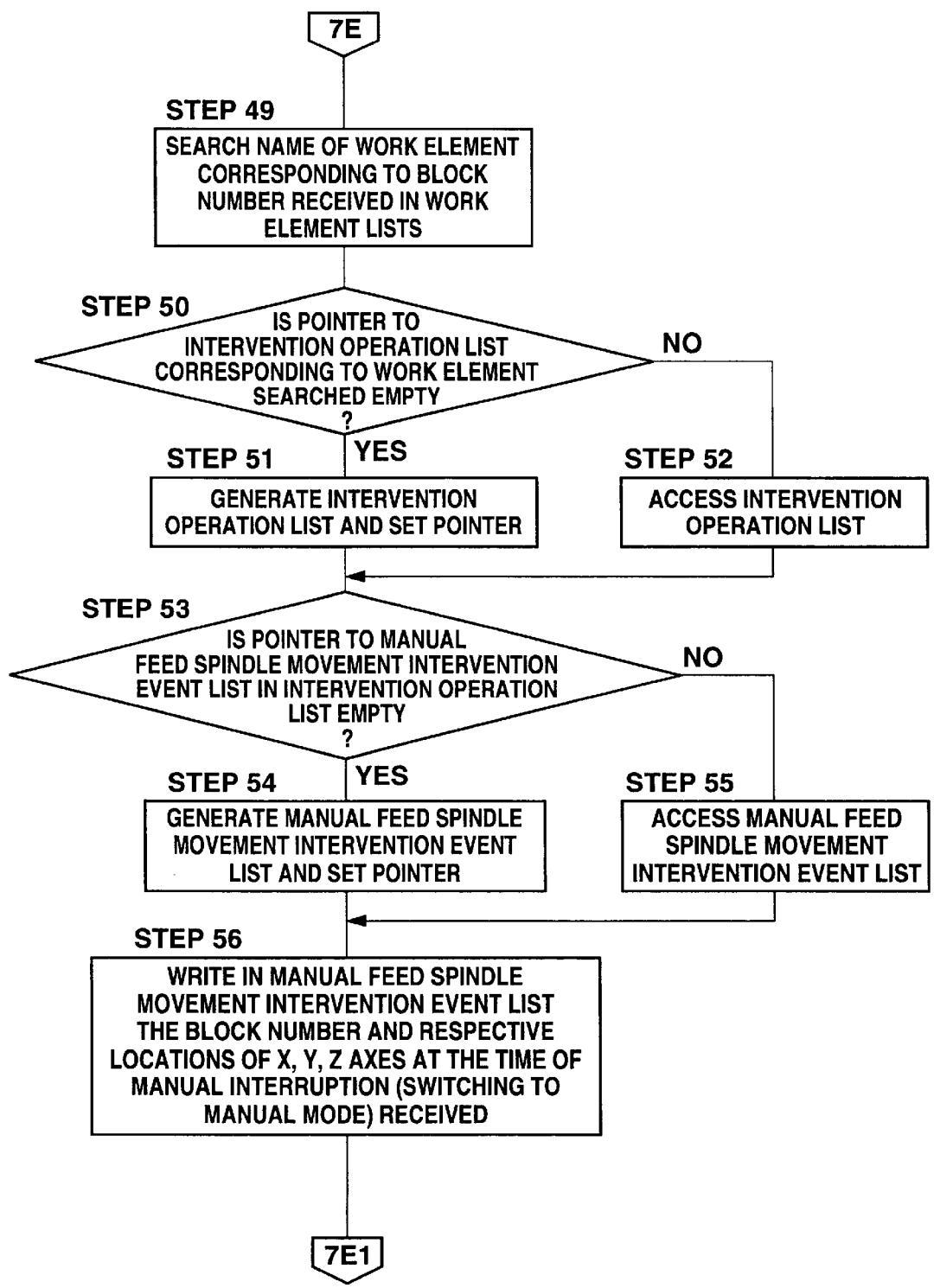

In FIG. 7E, when respective locations of the X, Y, and Z axes at the time of switching to a manual mode are received, at Step 49 the operator's intervention operation history generating section 31 searches a name of the work element in the work element lists of FIG. 8 which corresponds to the block number received. At Step 50, it is judged if information which links with the intervention operation list corresponding to the work element searched is empty. If the link information is empty, at Step 51 an intervention operation list (described hereinafter) will be newly generated, and the information which links with the intervention operation list will be set. If the information which links with an intervention list is not empty, according to the link information, the subsequent intervention operation list will be accessed at Step 52. At Step 53, it is judged if information which links with a manual feed spindle movement intervention event list (described hereinafter) is empty. If the link information is empty, at Step 54 a manual feed spindle movement intervention event list will be newly generated, and the information which links with the intervention event list will be set. If the information which links with a manual feed spindle movement intervention event list is not empty, according to the link information, the subsequent intervention event list will be accessed at Step 55. At Step 56, a block number and respective locations of the X, Y, and Z axes at the time of manual interruption are written in the manual feed spindle movement intervention event list.

Figure 7F:
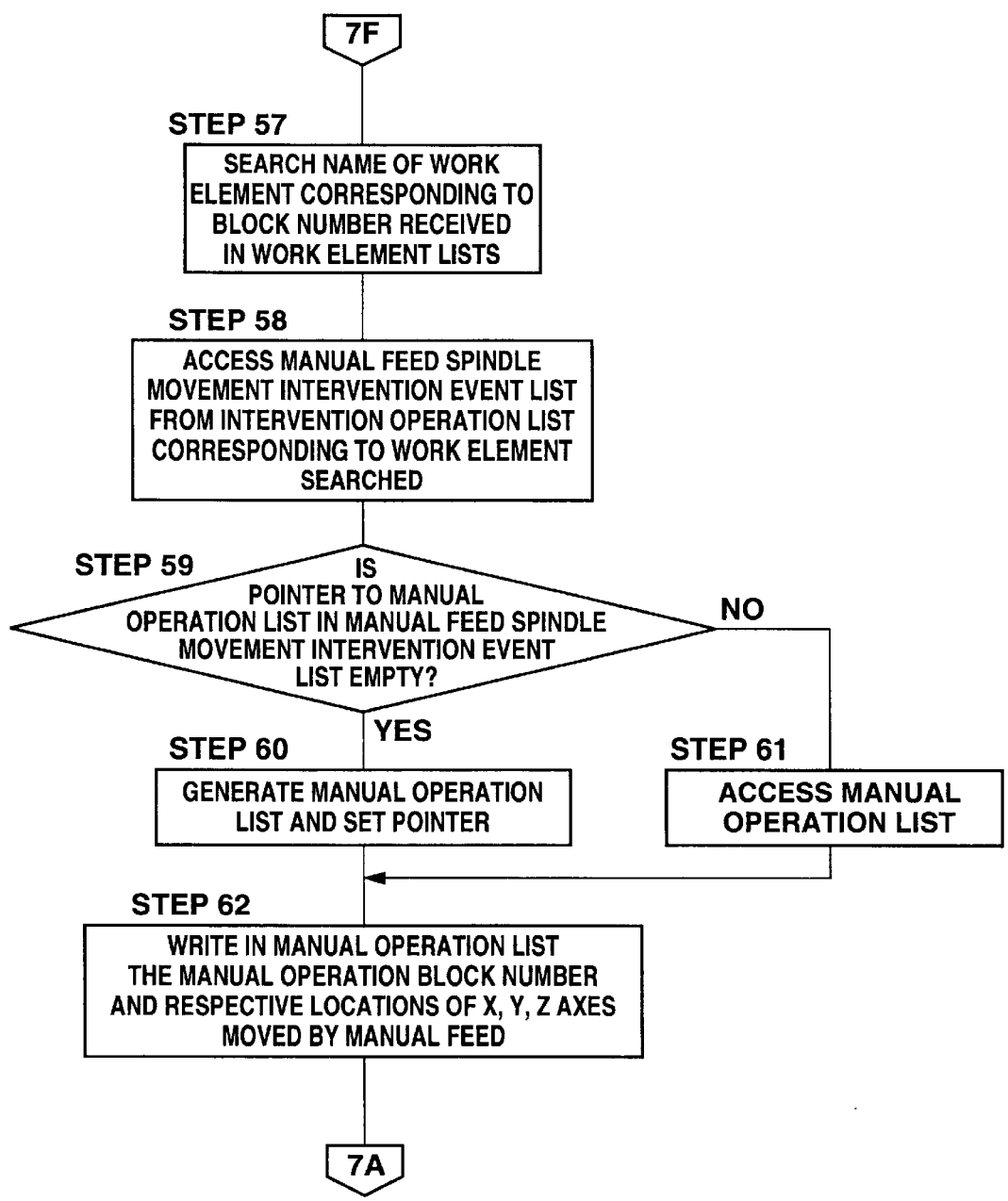

In FIG. 7F, when respective locations of the X, Y, and Z axes moved in a manual mode are received, at Step 57 the operator's intervention operation history generating section 31 searches a name of the work element in the work element lists of FIG. 8 which corresponds to the block number received. At Step 58, according to information which links with a manual feed spindle movement intervention event list, the subsequent intervention event list is accessed from an intervention operation list corresponding to the work element searched. At Step 59, it is judged if information which links with a manual operation list in the manual feed spindle movement intervention event list is empty. If the link information is empty, a manual operation list (described hereinafter) will be newly generated and the information which links with the manual operation list will be set at Step 60. If the information which links with a manual operation list is not empty, according to the link information, the subsequent manual operation list will be accessed at Step 61. At Step 62, a manual operation block number and respective locations of the X, Y, and Z axes moved in a manual feed mode are written in the manual operation list.

Figure 9A:
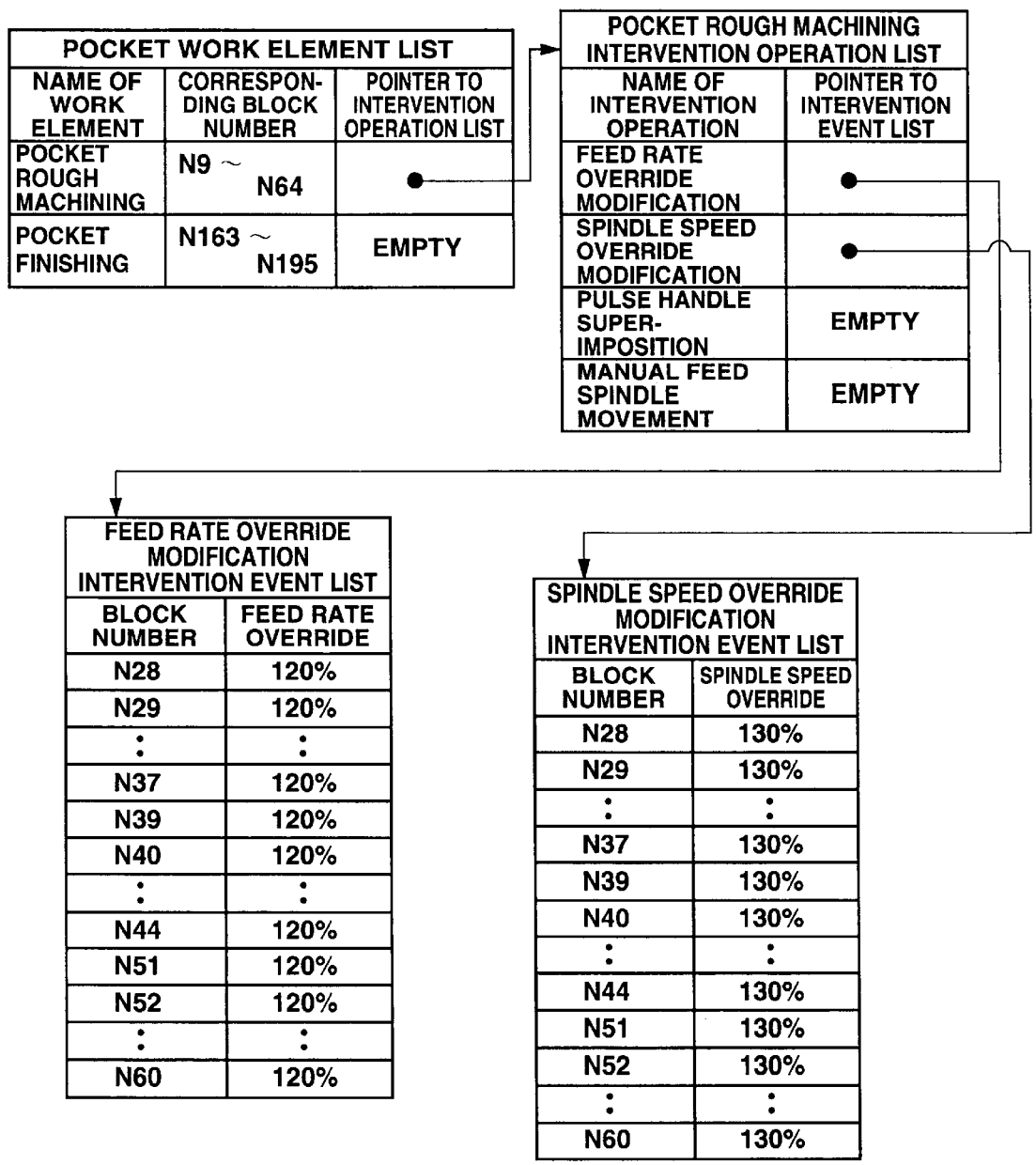
FIGS. 9A, 9B, 9C, and 9D show an example of the intervention operation history data base generated by the operator's intervention operation history generating section.

So far, operation of the operator's intervention operation monitoring section 30 and the operator's intervention operation history generating section 31 has been described. Concrete examples will subsequently be described with reference to the drawing for machining shown in FIG. 4, the NC program shown in FIGS. 5A, 5B, 5C, and 5D, and respective structural drawings of the intervention operation history data base shown in FIGS. 9A, 9B, and 9C. First, while executing blocks corresponding to block numbers N28 to N37, N39 to N44, and N51 to N60 in pocket rough machining according to the NC program, a machining operator changes a feed rate override from 100 percent to 120 percent and simultaneously changes a spindle speed override from 100 percent to 130 percent. In this case, by the operator's intervention operation monitoring section 30 and the operator's intervention operation history generating section 31, the pocket rough machining intervention operation list, the feed rate override modification intervention event list referred by link information in the intervention operation list, and the spindle speed override modification intervention event list as shown in FIG. 9A are generated as an intervention operation history data base 32. Due to the data base, for example, a name of the work element and the block number involved, a machining condition which required some modification, and how the machining condition was actually modified can be recorded as an intervention operation history. Therefore, machining conditions, such as a feed rate and a spindle speed for a specified work element, can be extracted as know-how acquired by the machining operator.

Figure 9B:
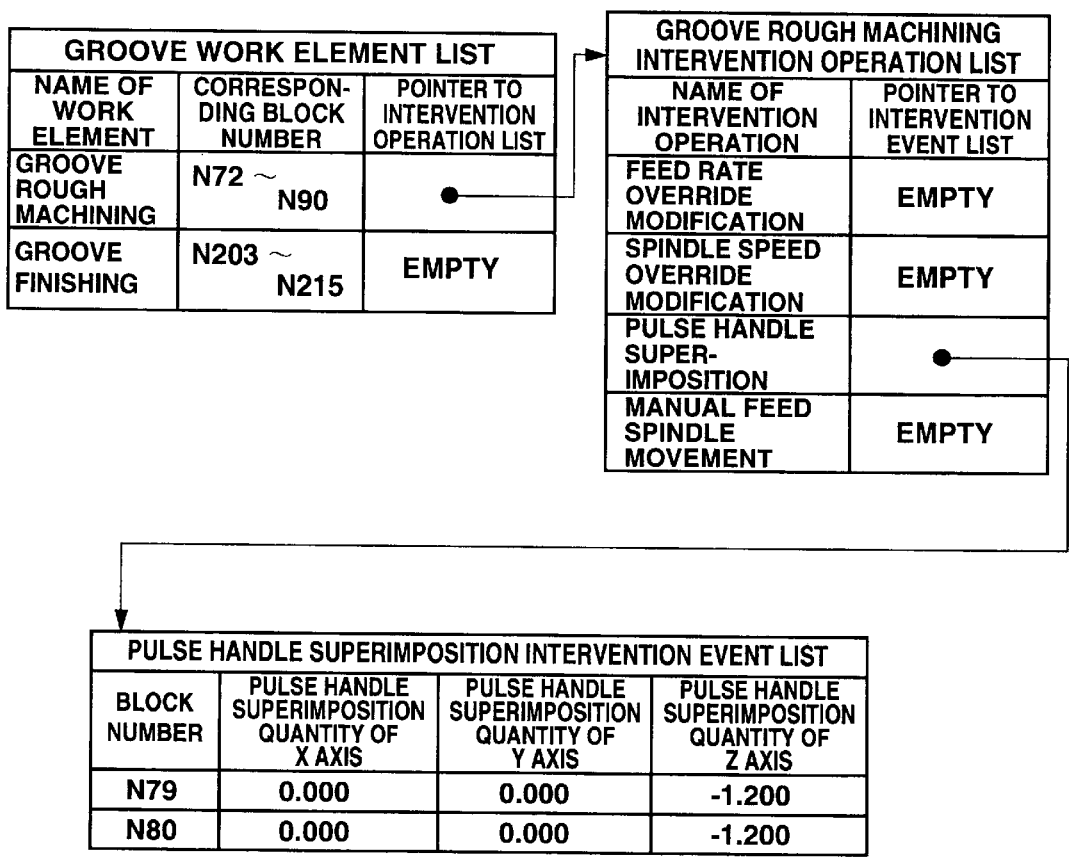

Next, when blocks corresponding to block numbers N79 and N80 are executed in groove rough machining according to the NC program, the machining operator sets a pulse handle superimposition mode and the groove is cut by 1.2 mm in a Z axis minus direction using a pulse handle. In this case, by the operator's intervention operation monitoring section 30 and the operator's intervention operation history generating section 31, a groove rough machining intervention operation list and a pulse handle superimposition intervention event list which is referred by link information in the intervention operation list as shown in FIG. 9B are generated as the intervention operation history data base 32. Due to the data base, for example, a name of the work element and the block number involved, a machining condition which required some modification, and how the machining condition was actually modified can be recorded as an intervention operation history. Therefore, a machining condition, such as a cutting depth for a specified work element, can be extracted as know-how owned by the machining operator.

Figure 9C:
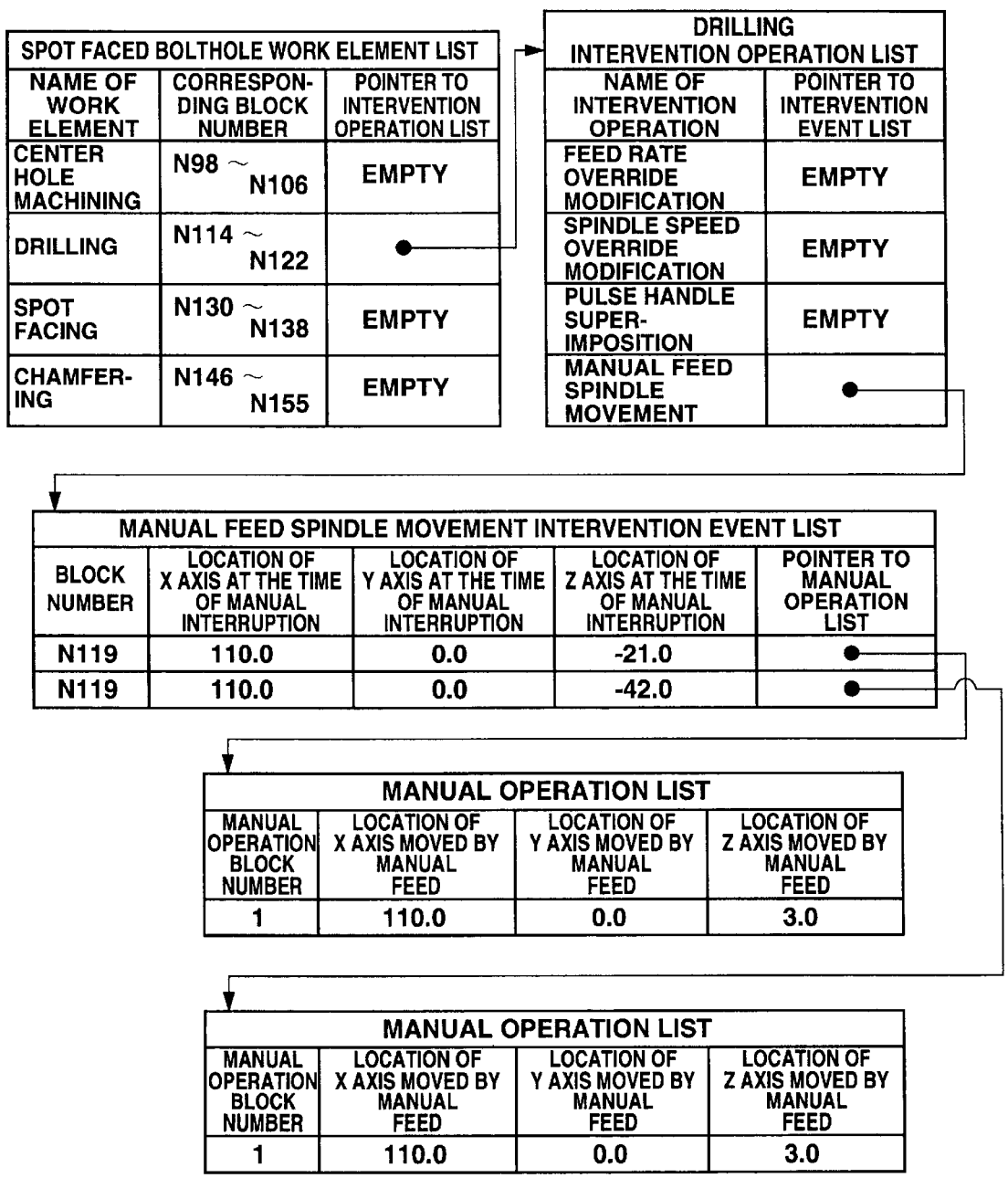

Further, when a drill edge reaches a location of Z axis of either −21.0 or −42 in a drilling operation sequence of block number N119 according to the NC program, the machining operator switches to a manual mode and moves the drill edge to a location of Z axis of 3.0. In this case, by the operator's intervention operation monitoring section 30 and the operator's intervention operation history generating section 31, a drilling intervention operation list, the manual feed spindle movement intervention event list which is referred by link information in the intervention operation list, and a manual operation list which is referred by link information in the intervention event list as shown in FIG. 9C are generated. Due to the data base, for example, a name of the work element and the block number involved, a machining condition which required some modification, and how the machining condition was actually modified can be recorded as an intervention operation history. Therefore, it is possible to extract as know-how acquired by the machining operator a machining condition that such an operation sequence as extracted as the above manual operation block is built in a predetermined machining operation sequence for a specified work element.

Figure 9D:
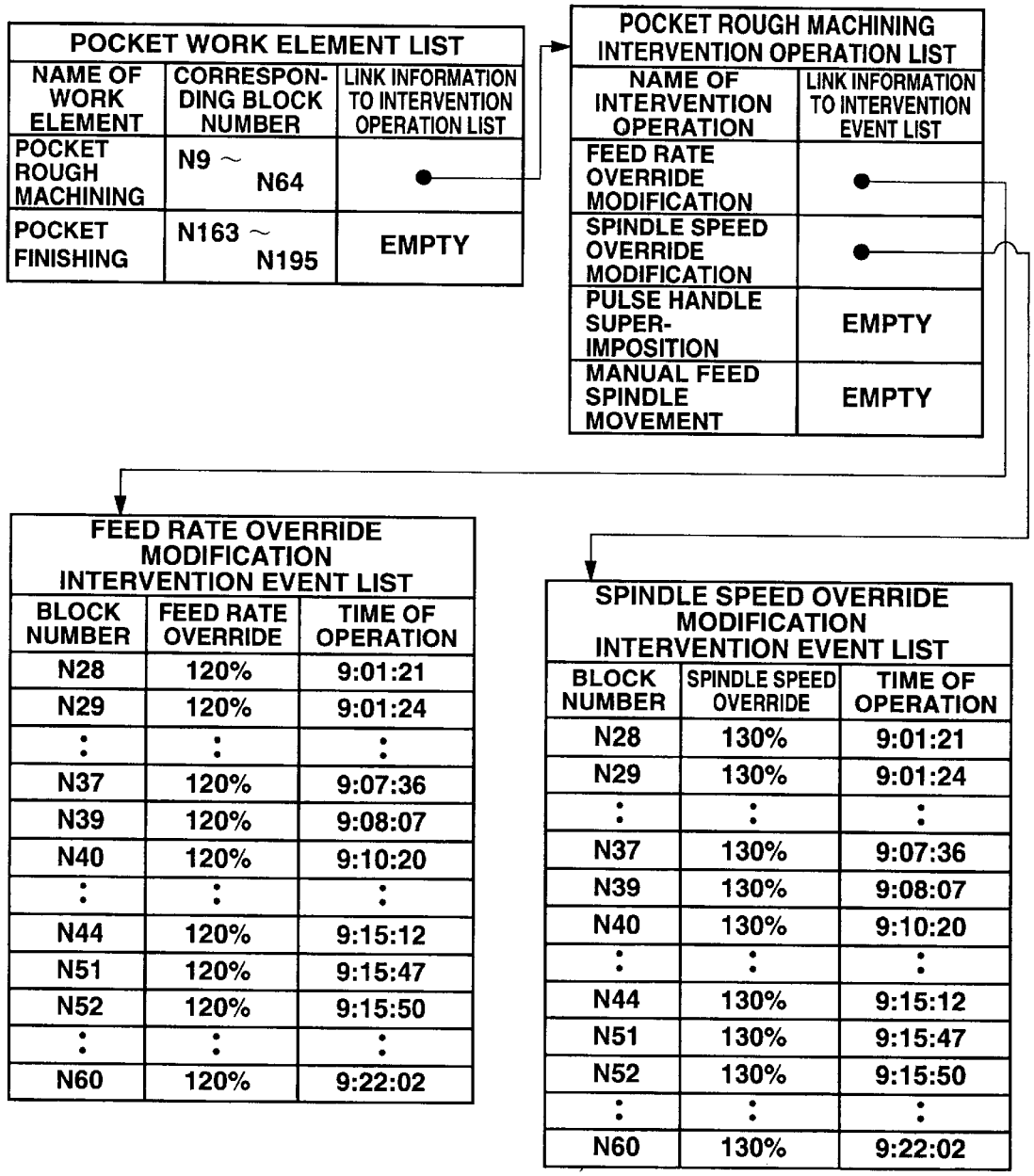

By making a record of time in these intervention operation event lists being generated, the timing and period of these operation can be kept as a history. FIG. 9D shows an example of recording the operating period of a feed rate override and a spindle speed override.

Incidentally, description of the above embodiment only covers running operation and machining conditions, such as four kinds of spindle movements by a feed rate override, a spindle speed override, a pulse handle superimposition, and a manual mode, either or both of which are extracted and stored. However, other running operations, for example, operation of temporary stop, dry run, single block, and reset, operation of spindle rotation stop/start/inching after switching to a manual mode, and operation of tool exchange can also be extracted and stored in a similar manner.

Further, the structure of an intervention operation history data base which is generated according to the present invention is shown in FIGS. 8, 9A, 9B, 9C, and 9D, but that is only an example. It is preferable that other suitable structures be adopted in executing the present invention as occasion demands.

As described above, if the numerical control method and device according to the present invention is applied, it will be possible to extract various running operation for adjustment and modification carried out by a machining operator in order for an NC program machining operation to be suitable for machining circumstances and/or to extract machining conditions modified resulting from the running operation and to use them as a data base.

As a result, when the NC program is operated, adjustment and modification work carried out by the machining operator is automatically collected. Thus, if such information is analyzed, quality of the NC program can be judged. Further, machining conditions which are adjusted and modified in such a manner are know-how in machining, and to automatically make a database using them means that the know-how in machining can be automatically collected and the data base collected and accumulated can be full of advanced knowledge as the operator becomes skillful. Further, if know-how is collected and accumulated for every work element like the embodiment of the present invention, it can easily be fed back into a data base of a CAD-CAM system or an automatic programming system.

Further, information collected and accumulated according to the present invention is not a machining operator's personal intellectual property, but is available to a machining factory as a whole and further an entire enterprise as intellectual property for machining in an expansive manner.

What is claimed is:

1. A running operation history collecting device in NC machining comprising:

running operation extracting means for extracting, every step a work element is machined, running operations carried out at the time of a machining operation using an NC program and/or a machining condition modified resulting from said running operation; and running operation storing means for generating a know-how database for use by NC machines by storing, every step the work element is machined, in a rewritable manner said running operation and/or said modified machining condition either or both of which are extracted.

2. The running operation history collecting device in NC machining according to claim 1, wherein said running operation extracting means include means for extracting modification operation of a feed rate, a spindle speed, or a cutting depth.

3. Running operation history collecting method in NC machining comprising:

a running operation extracting step of extracting, every step a work element is machined, running operation carried out when machining operation is performed using an NC program and/or a machining condition modified due to said running operation; and a running operation storing step of generating a know-how database for use by NC machines by storing, every step the work element is machined, in a rewritable manner said running operation and/or said modified machining condition either or both of which are extracted.

4. A medium in which a program is recorded to execute a running operation extracting procedure for extracting, every step a work element is machined, running operation performed at the time of a machining operation using an NC program and/or a machining condition modified resulting from said running operation and to execute a running operation storing procedure for generating a know-how database for use by NC machines by storing, every step the work element is machined, in a rewritable manner said running operation and/or said modified condition, either or both of which are extracted.

* * * * *